US012803311B2

(12) United States Patent
Kim

(10) Patent No.: US 12,803,311 B2
(45) Date of Patent: Nov. 17, 2026

(54) BATTERY MANAGEMENT APPARATUS AND OPERATING METHOD THEREOF

(71) Applicant: LG Energy Solution, Ltd., Seoul (KR)

(72) Inventor: Jin Hwan Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 493 days.

(21) Appl. No.: 18/562,007

(22) PCT Filed: Sep. 28, 2022

(86) PCT No.: PCT/KR2022/014572
§ 371 (c)(1),
(2) Date: Nov. 17, 2023

(87) PCT Pub. No.: WO2023/063630
PCT Pub. Date: Apr. 20, 2023

(65) Prior Publication Data

US 2024/0243595 A1 Jul. 18, 2024

(30) Foreign Application Priority Data

Oct. 15, 2021 (KR) ........................ 10-2021-0137791

(51) Int. Cl.
*H01M 10/44* (2006.01)
*H01M 10/46* (2006.01)
(Continued)

(52) U.S. Cl.
CPC . *H02J 7/80* (2026.01); *H02J 7/50* (2026.01)

(58) Field of Classification Search
CPC ........ H02J 7/80; H02J 7/50; G01R 19/16566; G01R 19/16542; G01R 31/392;
(Continued)

(56) References Cited

U.S. PATENT DOCUMENTS

2010/0296204 A1 11/2010 Ichikawa et al.
2013/0320986 A1 12/2013 Shiraishi et al.
(Continued)

FOREIGN PATENT DOCUMENTS

CN 106546916 A 3/2017
CN 106842006 A 6/2017
(Continued)

OTHER PUBLICATIONS

Search Report dated Mar. 11, 2026 from the Office Action for Chinese Application No. 202280034286.8 issued Mar. 14, 2026, pp. 1-3.

(Continued)

*Primary Examiner* — Edward Tso
(74) *Attorney, Agent, or Firm* — Lerner David LLP

(57) ABSTRACT

A battery management apparatus includes a processor and memory having programmed thereon instructions that, when executed, are configured to cause the processor to, for each battery pack of the plurality of battery packs connected in parallel, measure a voltage and a current of the battery pack, calculate a voltage difference between both terminals of at least one relay of the battery pack, based on the measured voltage of the battery pack, and control an operation of the at least one relay included in the battery pack and determine whether any of the one or more relays of any of the plurality of battery packs is stuck, based on respective operations of the one or more relays included in the plurality of battery pack, the respective voltage differences of the one or more relays include in the plurality of battery packs, and the measured currents of the plurality of battery packs.

15 Claims, 7 Drawing Sheets

(51) Int. Cl.
*H02J 7/50* (2026.01)
*H02J 7/80* (2026.01)

(58) Field of Classification Search
CPC ................ G01R 31/3275; G01R 31/52; G01R 31/3278; G01R 31/396
USPC ................. 320/107, 116, 118, 119, 132, 148
See application file for complete search history.

(56) References Cited

U.S. PATENT DOCUMENTS

| | | | |
|---|---|---|---|
| 2014/0354054 | A1 | 12/2014 | Katou |
| 2015/0372477 | A1 | 12/2015 | Mo et al. |
| 2016/0084908 | A1 | 3/2016 | Shiraishi et al. |
| 2016/0336736 | A1 | 11/2016 | Nomura et al. |
| 2018/0170205 | A1 | 6/2018 | Yoon |
| 2019/0077267 | A1 | 3/2019 | Song |
| 2019/0267679 | A1 | 8/2019 | Lee |
| 2020/0011929 | A1 | 1/2020 | Wang et al. |
| 2020/0099234 | A1 | 3/2020 | Yoon |
| 2020/0144832 | A1 | 5/2020 | Kim |
| 2020/0217893 | A1 | 7/2020 | Song |
| 2020/0355746 | A1 | 11/2020 | Ham et al. |
| 2021/0119277 | A1 | 4/2021 | Kim |
| 2022/0260637 | A1 | 8/2022 | Park |

FOREIGN PATENT DOCUMENTS

| | | | | | |
|---|---|---|---|---|---|
| CN | 109143048 | A | | 1/2019 | |
| CN | 208607324 | U | | 3/2019 | |
| CN | 112924859 | A | | 6/2021 | |
| CN | 113156307 | A | | 7/2021 | |
| EP | 3581950 | A1 | | 12/2019 | |
| EP | 4481987 | A2 | * | 12/2024 | H02J 7/855 |
| JP | 2008154439 | A | | 7/2008 | |
| JP | 2014232640 | A | | 12/2014 | |
| JP | 2017005939 | A | * | 1/2017 | |
| JP | 2017079496 | A | | 4/2017 | |
| JP | 2017117618 | A | | 6/2017 | |
| JP | 2018538774 | A | | 12/2018 | |
| JP | 2020075095 | A | | 5/2020 | |
| JP | 6819007 | B2 | | 1/2021 | |
| KR | 101521985 | B1 | | 5/2015 | |
| KR | 101562016 | B1 | | 11/2015 | |
| KR | 20180069628 | A | | 6/2018 | |
| KR | 20180134205 | A | | 12/2018 | |
| KR | 20190001584 | A | | 1/2019 | |
| KR | 101953121 | B1 | | 2/2019 | |
| KR | 102044598 | B1 | | 11/2019 | |
| KR | 20200025762 | A | | 3/2020 | |
| KR | 20200030393 | A | | 3/2020 | |
| KR | 20200075095 | A | | 6/2020 | |
| KR | 20210044026 | A | | 4/2021 | |
| KR | 20210045841 | A | | 4/2021 | |
| KR | 102270232 | B1 | | 6/2021 | |
| KR | 20210080070 | A | | 6/2021 | |
| WO | 2021123722 | A1 | | 6/2021 | |

OTHER PUBLICATIONS

Extended European Search Report including Written Opinion for Application No. 22881259.0 dated Oct. 22, 2024, pp. 1-9.
International Search Report for PCT/KR2022/014572 mailed Jan. 11, 2023. 3 pages.
Communication pursuant to Article 94(3) EPC for European Application No. 22881259.0, dated Jun. 24, 2025, 6 pages.

* cited by examiner

BATTERY MANAGEMENT APPARATUS AND OPERATING METHOD THEREOF

CROSS-REFERENCE TO RELATED APPLICATION

The present application is a national phase entry under 35 U.S.C. § 371 of International Application No. PCT/KR2022/014572 filed Sep. 28, 2022, which claims priority from Korean Application No. 10-2021-0137791 filed Oct. 15, 2021, all of which are incorporated herein by reference.

TECHNICAL FIELD

Embodiments disclosed herein relate to a battery management apparatus and an operating method thereof.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium-ion batteries. Among the secondary batteries, a lithium-ion battery has a much higher energy density than those of the conventional Ni/Cd batteries, Ni/MH batteries, etc. Moreover, the lithium-ion battery may be manufactured to be small and lightweight, such that the lithium-ion battery has been used as a power source of mobile devices, and recently, a use range thereof has been extended to power sources for electric vehicles, attracting attention as next-generation energy storage media.

Devices using batteries mostly use a plurality of battery packs by connecting them in parallel. When the plurality of battery packs are used by being connected in parallel, in case that a relay included in any one battery pack is stuck, a voltage of an output terminal of all of the battery packs are measured as the same value, making it impossible to determine which battery pack includes the stuck relay. That is, there is a need for a method that is different from a method of determining whether a relay is stuck in a single battery pack.

SUMMARY

Technical Problem

Embodiments disclosed herein aim to provide a battery management apparatus and an operating method thereof in which it may be possible to determine whether there is a stuck relay among relays included in a plurality of battery packs connected in parallel and to determine which battery pack among the plurality of battery packs includes the stuck relay.

Technical problems of the embodiments disclosed herein are not limited to the above-described technical problems, and other unmentioned technical problems would be clearly understood by one of ordinary skill in the art from the following description.

Technical Solution

A battery management apparatus according to an embodiment disclosed herein includes a processor and memory having programmed thereon instructions that, when executed, are configured to cause the processor to, for each battery pack of the plurality of battery packs connected in parallel: measure a voltage and a current of the battery pack, calculate a voltage difference between both terminals of at least one relay of the battery pack, based on the measured voltage of the battery pack, and control an operation of the at least one relay included in the battery pack and determine whether any of the one or more relays of any of the plurality of battery packs is stuck, based on respective operations of the one or more relays included in each of the plurality of battery packs, the respective voltage differences of the one or more relays included in the plurality of battery packs, and the measured currents of the plurality of battery packs.

In an embodiment, for each battery pack of the plurality of battery packs, the one or more relays comprise a first relay, the voltage difference between both terminals of the first relay is a first voltage.

In an embodiment, the instructions may be further configured to cause the processor to determine that at least one first relay of at least one battery pack is stuck based on the first voltage of the at least one relay being less than or equal to a first set value.

In an embodiment, the one or more relays further comprise a second relay and the instructions may be further configured to cause the processor to, in response to at least one first relay being stuck, sequentially short-circuit each second relay of each of the plurality of battery packs and determine which first relay of the plurality of a battery packs is stuck based on the first relay having a measured in-rush current when its respective second relay is short-circuited.

In an embodiment, the one ore more relays further comprises a second relay, and the voltage difference between both terminals of the second relay is a second voltage.

In an embodiment, the instructions may be further configured to cause the processor to determine that at least one second relay is stuck based on the second voltage of the second relay being less than or equal to a second set value.

In an embodiment, the one or more relays further comprise a precharge relay and the instructions may be further configured to cause the processor to, in response to at least one second relay being stuck, sequentially short-circuit each precharge relay of the plurality of battery packs and determine which second relays of the battery packs is stuck based on the second relay having a measured precharge current when its respective precharge relay is short-circuited.

In an embodiment, the one or more relays may comprise a first relay and a second relay, wherein the first relay may be a main relay and the second relay may be a negative relay.

In an embodiment, the battery management apparatus may be included in any of the plurality of battery packs.

In an embodiment, the battery management apparatus may be included in a higher-level controller of the plurality of battery packs.

An operating method of a battery management apparatus according to an embodiment disclosed herein includes for each battery pack of the plurality of battery packs connected in parallel, measuring, by a processor, a voltage and a current of each of the plurality of battery packs, calculating, by the processor, a voltage difference between both terminals of at least one relay of the battery pack, based on the measured voltage of the battery pack, and controlling, by the processor, an operation of the at least one relay included in the battery pack and determining, by the processor, whether any of the one or more relays of any of the plurality of battery packs is stuck, based on the respective operations of one or more relays included in the plurality of battery packs, the respective voltage differences of the relay of the one or more relays included in the plurality of battery packs, and the measured current of the plurality of battery packs.

In an embodiment, for each battery pack of the plurality of battery packs, the at least one relay includes a first relay, and the voltage difference between both terminals of the first relay is a first voltage.

In an embodiment, for each battery pack of the plurality of battery packs, the at least one relay further includes a second relay, and the at least one first relay is determined to be stuck based on the first voltage corresponding to the first relay being less than or equal to a first set value, the method further comprising, in response to determining that at least one first relay is stuck, sequentially short-circuiting each second relay of the plurality of battery packs, and determining which first relay of the plurality of battery packs is stuck based on the first relay having a measured in-rush current is stuck when its respective second relay is short-circuited.

In an embodiment, the one or more relays further comprises a second relay and the voltage difference between both terminals of the second relay is a second voltage.

In an embodiment, for each battery pack of the plurality of battery packs, the at least one relay further includes a precharge relay, and the at lest one second relay is determined to be stuck based on the second voltage corresponding to the second relay being less than or equal to a second set value, the method further comprises in response to determining that the at least one second relay is stuck, sequentially short-circuiting each precharge relay of the plurality of battery packs, and determining which second relay of the plurality of battery packs is stuck based on the second relay having a measured precharge current when respective precharge relay is short-circuited.

Advantageous Effects

A battery management apparatus and an operating method thereof according to an embodiment disclosed herein may determine whether at least one of relays included in a plurality of battery packs connected in parallel is stuck and determine which battery pack among the plurality of battery packs connected in parallel includes the stuck battery.

A battery management apparatus and an operating method thereof according to an embodiment disclosed herein may determine which main relay or negative relay included in a plurality of battery packs connected in parallel is stuck.

Moreover, various effects recognized directly or indirectly from the disclosure may be provided.

DETAILED DESCRIPTION

Figure 1:
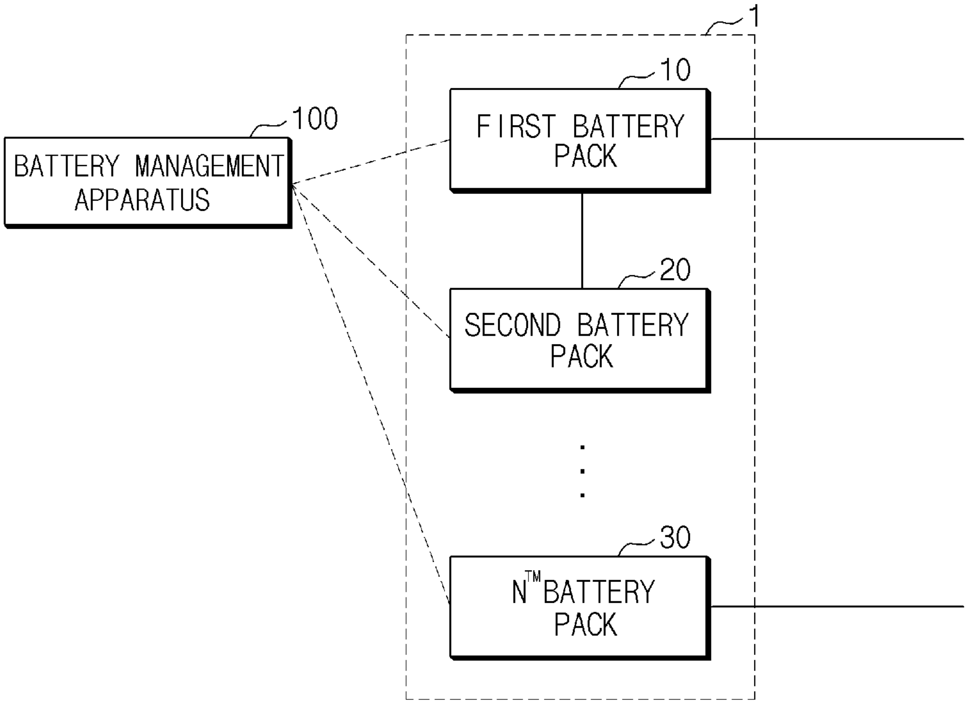
FIG. 1 is a diagram showing a plurality of battery packs and a battery management apparatus, according to an embodiment disclosed herein.

Hereinafter, embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These terms are used merely for distinguishing one component from another component and do not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present application.

FIG. 1 is a diagram showing a plurality of battery packs and a battery management apparatus, according to an embodiment disclosed herein.

Referring to FIG. 1, a plurality of battery packs 1 may include a plurality of battery packs. For example, the plurality of battery packs 1 may include a first battery pack 10, a second battery pack 20, and an $n^{th}$ battery pack 30. Although the plurality of battery packs 1 are illustrated as including three battery packs in FIG. 1, the present invention is not limited thereto, and the plurality of battery packs 1 may include n battery packs (n is a natural number equal to or greater than 2).

The plurality of battery packs 1 may be connected in parallel. For example, the first battery pack 10, the second battery pack 20, and the $n^{th}$ battery pack 30 may be connected with one another in parallel. The plurality of battery packs 1 are connected in parallel, such that a voltage of an output terminal of the plurality of battery packs 1 may be the same as a voltage of an output terminal of the first battery pack 10, a voltage of an output terminal of the second battery pack 20, and a voltage of an output terminal of the $n^{th}$ battery pack 30.

A battery management apparatus 100 may control the plurality of battery packs 1. For example, the battery management apparatus 100 may control the respective battery packs 10, 20, and 30 included in the plurality of battery packs 1.

In an embodiment, the battery management apparatus 100 may be included in any one battery pack of the plurality of battery packs 1. For example, the battery management apparatus 100 may be included in the first battery pack 10. In another example, the battery management apparatus 100 may be included in the second battery pack 20 or the $n^{th}$ battery pack 30.

In another embodiment, the battery management apparatus 100 may be included in a higher-level controller (not shown) of the plurality of battery packs 1.

The battery management apparatus 100 may measure a voltage or a current of the plurality of battery packs 1. For example, the battery management apparatus 100 may directly measure a voltage or a current of the plurality of battery packs 1 and obtain a measurement value of a voltage or a current of each of the plurality of battery packs 1, measured by each of the plurality of battery packs 1.

The battery management apparatus 100 may calculate a first voltage that is a voltage difference between both terminals of a first relay of each of the plurality of battery packs 1 and a second voltage that is a voltage difference between both terminals of a second relay. For example, the first relay may be a main relay of each of the plurality of battery packs 1, and the second relay may be a negative relay of each of the plurality of battery packs 1.

The battery management apparatus 100 may determine whether the first relay or the second relay included in the plurality of battery packs 1 is stuck, based on the first voltage and the second voltage.

The battery management apparatus 100 may control a relay included in the plurality of battery packs 1. For example, the battery management apparatus 100 may control a first relay, a second relay, and a precharge relay included in each of the battery packs 10, 20, and 30 included in the plurality of battery packs 1. In another example, the battery management apparatus 100 may generate a control signal capable of controlling each relay included in the plurality of battery packs 1 and transmit the generated control signal to each of the plurality of battery packs 1.

When the battery management apparatus 100 determines that the first relay or the second relay included in the plurality of battery packs 1 is stuck, the battery management apparatus 100 may determine which battery pack among the plurality of battery packs 1 includes a stuck first or second relay. For example, by sequentially short-circuiting a relay included in the plurality of battery packs 1, the battery management apparatus 100 may determine which battery pack among the plurality of battery packs 1 includes a stuck first or second relay.

The battery management apparatus 100 according to an embodiment disclosed herein may control a relay included in the plurality of battery packs 1 based on information about the plurality of battery packs 1 and determine which relay among relays included in the plurality of battery packs 1 is stuck.

Figure 2:
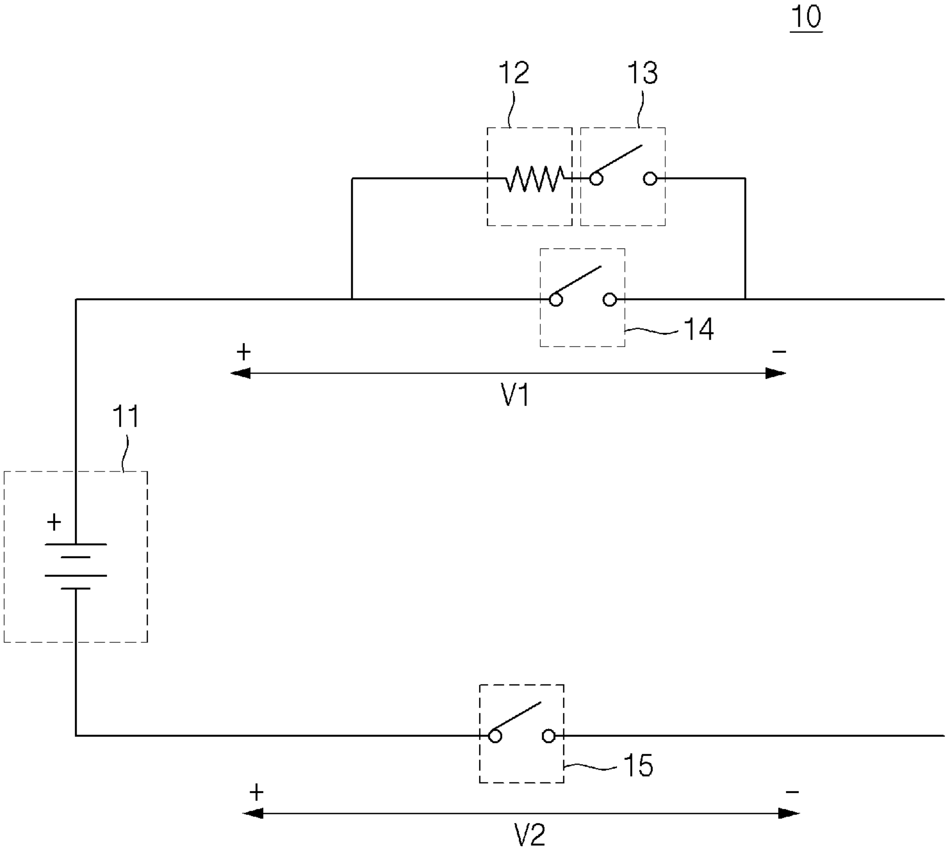
FIG. 2 is a block diagram showing in detail a battery management pack according to an embodiment disclosed herein.

FIG. 2 is a block diagram showing in detail a battery management pack according to an embodiment disclosed herein.

Referring to FIG. 2, a battery pack 10 according to an embodiment disclosed herein may include a battery module 11, a precharge resistor 12, a precharge relay 13, a main relay 14, and a negative relay 15. In an embodiment, the battery pack 10 may be substantially the same as each of the battery packs 10, 20, and 30 included in the plurality of battery packs of FIG. 1.

The battery module 11 may include one or more chargeable/dischargeable battery cells. According to an embodiment, the battery pack 10 may include a plurality of battery modules. In this case, the plurality of battery modules may be connected in series or in parallel.

A precharge resistor 12 may play a role in applying a load when the battery pack 10 is charged and/or discharged. For example, the precharge resistor 12 may be a resistor for limiting a speed of charging or discharging to balance a voltage with an external device (at least any one of an inverter, a converter, or a capacitor) in charging and/or discharging of the battery pack 10.

The precharge relay 13 and the main relay 14 may form charging and discharging paths of the battery pack 10. For example, the battery pack 10 may short-circuit the precharge relay 13 and open the main relay 14 in a precharge phase, and open the precharge relay 13 and short-circuit the main relay 14 in a main charge phase. In another example, the battery pack 10 may open both the precharge relay 13 and the main relay 14 when the battery pack 10 is not used. In an embodiment, operations of the precharge relay 13 and the main relay 14 may be controlled by a control signal delivered from the battery management apparatus 100 of FIG. 1. In another embodiment, the battery management apparatus 100 of FIG. 1 may control an operation of the precharge relay 13 or the main relay 14.

The negative relay 15 may connect a ground of the battery pack 10 with the battery module 11.

The battery management apparatus (the battery management apparatus 100 of FIG. 1) may measure a voltage across both terminals of the first relay (the main relay 14). In another example, the battery management apparatus (the battery management apparatus 100 of FIG. 1) may obtain the voltage across both terminals of the first relay (the main relay 14), measured in the battery pack 10.

The battery management apparatus (the battery management apparatus 100 of FIG. 1) may measure a voltage across both terminals of the second relay (the negative relay 15). In another example, the battery management apparatus (the battery management apparatus 100 of FIG. 1) may obtain the voltage across both terminals of the second relay (the negative relay 15), measured in the battery pack 10.

Although not shown in FIG. 2, the battery pack 10 may include a sensor for measuring a current or a voltage of the battery pack 10. For example, the sensor may transmit the measured current or voltage to the battery management apparatus (the battery management apparatus 100 of FIG. 1).

The battery management apparatus (the battery management apparatus 100 of FIG. 1) may monitor the voltage, current, temperature, etc., of the battery pack 10 to perform control and management to prevent overcharge and overdischarge, etc.

The battery management apparatus (the battery management apparatus 100 of FIG. 1) may also determine whether the main relay 14 or the negative relay 15 is stuck.

In an embodiment, the battery management apparatus (the battery management apparatus 100 of FIG. 1) may be included in the battery pack 10.

Figure 3:
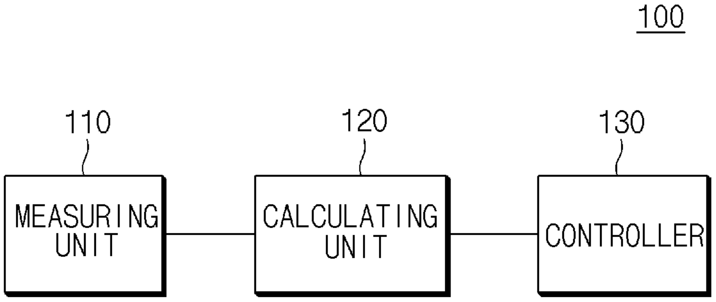
FIG. 3 is a block diagram of a battery management apparatus according to an embodiment disclosed herein.

FIG. 3 is a block diagram of a battery management apparatus according to an embodiment disclosed herein.

Referring to FIG. 3, the battery management apparatus 100 according to an embodiment disclosed herein may include a measuring unit 110, a calculating unit 120, and a controller 130.

The measuring unit 110 may measure a voltage or current of a plurality of battery packs (the plurality of battery packs 1 of FIG. 1) connected in parallel. For example, the measuring unit 110 may directly measure a voltage or a current of each of the plurality of battery packs and obtain the voltage or the current measured in each of the plurality of battery packs. The voltage or current of the plurality of battery packs, measured or obtained by the measuring unit 110, may be transmitted to the calculating unit 120 or the controller 130.

The calculating unit 120 may calculate a voltage difference between both terminals of a relay of the plurality of battery packs, based on the measured voltage of the plurality of battery packs. For example, the first voltage that is a voltage difference between both terminals of the first relay of the plurality of battery packs may be calculated. In another example, the first relay may be a main relay. In another example, the calculating unit 120 may calculate a voltage difference between both terminals of the main relay of each of the plurality of battery packs.

The calculating unit 120 may also calculate the second voltage that is a voltage difference between both terminals of the second relay of the plurality of battery packs, based on the measured voltage of the plurality of battery packs. For example, the second relay may be a negative relay. In another example, the calculating unit 120 may calculate a voltage difference between both terminals of the negative relay of each of the plurality of battery packs.

The controller 130 may control an operation of the relay included in each of the plurality of battery packs. For example, the controller 130 may control operations of a precharge relay, the first relay (the main relay), and the second relay (the negative relay) included in each of the plurality of battery packs. According to an embodiment, the controller 130 may generate a control signal for controlling the relay included in each of the plurality of battery packs and transmit the generated control signal to each of the plurality of battery packs, thereby controlling the operation of the relay included in each of the plurality of battery packs.

The controller 130 may determine whether the relay of each of the plurality of battery packs is stuck, based on the operation of the relay included in each of the plurality of battery packs, a voltage difference between both terminals of the relay of the plurality of battery packs, and the measured current of the plurality of battery packs. For example, the controller 130 may determine whether the relay of each of the plurality of battery packs is stuck, based on operations of the first relay and the second relay included in each of the plurality of battery packs, the first voltage, the second voltage, the voltage of the plurality of battery packs, and the current of the plurality of battery packs. In another example, the controller 130 may determine that some first relays included in the plurality of battery packs are stuck when the first voltage is less than or equal to a first set value. In another example, the controller 130 may determine that some second relays included in the plurality of battery packs are stuck when the second voltage is less than or equal to a second set value. In an embodiment, the first set value may be 50 V and the second set value may be 3 V.

In an embodiment, when all first relays included in the plurality of battery packs are opened, the first voltage may be a voltage of the battery pack. When some first relays included in the plurality of battery packs are stuck, the voltage difference between both terminals of the first relay may be small as being less than or equal to 50 V. That is, the controller 130 may determine that some first relays included in the plurality of battery packs are stuck when the first voltage is less than or equal to a first set value.

When determining that some first relays are stuck, the controller 130 may sequentially short-circuit the second relays respectively included in the plurality of battery packs. When an in-rush current is measured in a battery pack including the short-circuited second relay, the controller 130 may determine that the first relay of the battery pack having the measured in-rush current is stuck. For example, when the second relay is short-circuited in the battery pack including the stuck first relay, the current flows through the first relay and the second relay, such that the in-rush current may be measured. That is, when the in-rush current is generated in the battery pack including the short-circuited second relay, the controller 130 may determine that the first relay of the battery pack including the short-circuited second relay is stuck. In another example, when the in-rush current is not generated in the battery pack in spite of short-circuiting the second relay, the controller 130 may open the second relay of the battery pack having no in-rush current generated and short-circuit the second relay of the next battery pack. In an embodiment, the controller 130 may determine that the first relay of the battery pack having an in-rush current of 100 mA or more measured is stuck.

In an embodiment, when all second relays included in the plurality of battery packs are opened, the voltage difference between both terminals of the second relay may be a half of the voltage of the battery pack by a bias switch of the battery pack. When some second relays included in the plurality of battery packs are stuck, the voltage difference between both terminals of the first relay may be small as being less than or equal to 3V. That is, the controller 130 may determine that some second relays included in the plurality of battery packs are stuck when the second voltage is less than or equal to a second set value.

When determining that some second relays are stuck, the controller 130 may sequentially short-circuit the precharge relays respectively included in the plurality of battery packs. When a precharge current is measured in a battery pack including the short-circuited precharge relay, the controller 130 may determine that the second relay of the battery pack having the measured precharge current is stuck. For example, when the precharge relay is short-circuited in the battery pack including the stuck second relay, the current flows through the second relay and the precharge relay, such that the precharge current may be measured. That is, when the precharge current is generated in the battery pack including the short-circuited precharge relay, the controller 130 may determine that the second relay of the battery pack including the short-circuited precharge relay is stuck. In another example, when the precharge current is not generated in the battery pack in spite of short-circuiting the precharge relay, the controller 130 may open the precharge relay of the battery pack having no precharge current generated and short-circuit the precharge relay of the next battery pack. In an embodiment, the controller 130 may determine that the second relay of the battery pack having a precharge current of 100 mA or more measured is stuck.

The battery management apparatus 100 according to an embodiment disclosed herein may determine whether some of the relays included in the plurality of battery packs are stuck and determine which battery pack among the plurality of battery packs includes the stuck first relay and/or second relay.

The battery management apparatus 100 according to an embodiment disclosed herein may guide, to the user, that a specific relay of a specific battery pack is short-circuited, when determining that there is a battery pack including short-circuited first relay and/or second relay, and the user may prevent accidents in advance by replacing or repairing the specific battery pack.

According to an embodiment, the battery management apparatus 100 may be included in any one battery pack of the plurality of battery packs. According to another embodiment, the battery management apparatus 100 may be included in a higher-level controller that controls the plurality of battery packs.

Figure 4:
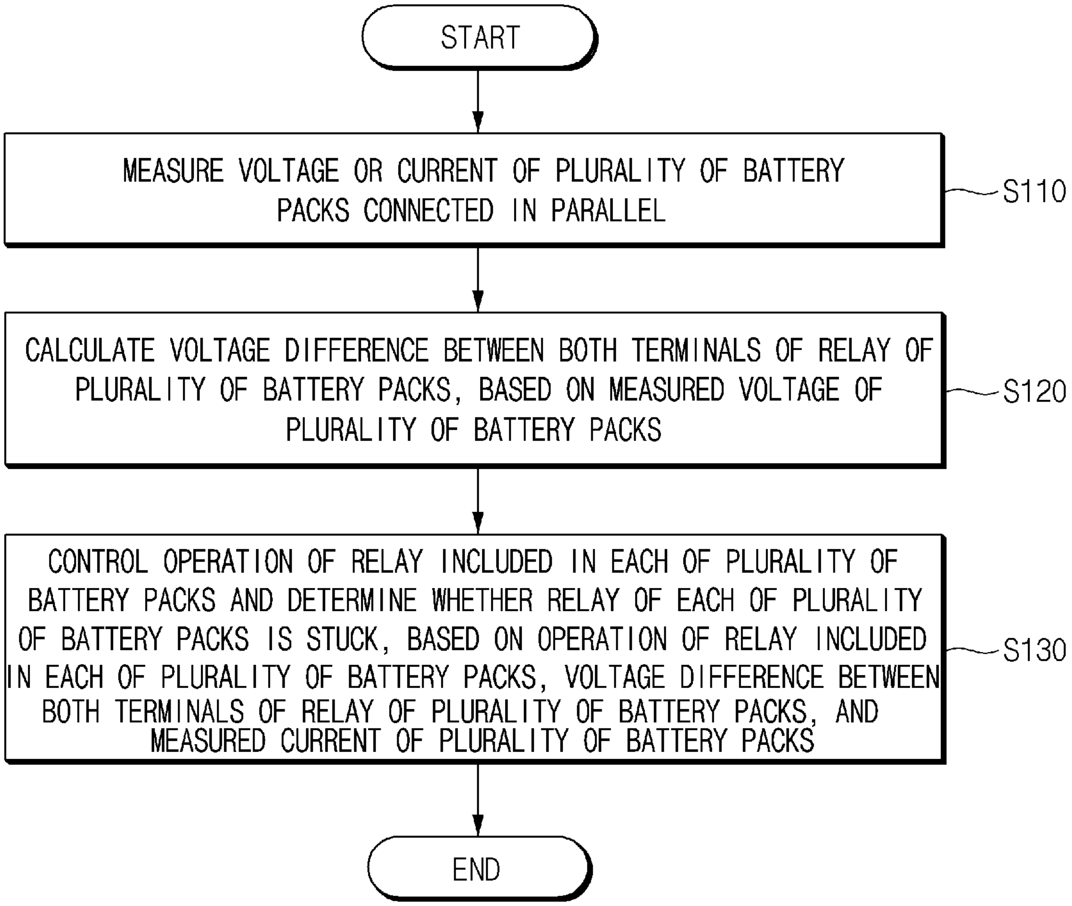
FIG. 4 is a flowchart of an operating method of a battery management apparatus according to an embodiment disclosed herein.

FIG. 4 is a flowchart of an operating method of a battery management apparatus according to an embodiment disclosed herein.

Referring to FIG. 4, an operating method of the battery management apparatus 100 according to an embodiment disclosed herein may include operation S110 of measuring a voltage or a current of a plurality of battery packs connected in parallel, operation S120 of calculating a voltage difference between both terminals of a relay of the plurality of battery packs based on the measured voltage of the plurality of battery packs, and operation S130 of controlling an operation of a relay included in each of the plurality of battery packs and determining whether the relay of each of the plurality of battery packs is stuck, based on the operation of the relay included in each of the plurality of battery packs, the voltage difference between the both terminals of the relay of the plurality of battery packs, and the measured current of the plurality of battery packs.

In operation S110 of measuring the voltage or current of the plurality of battery packs connected in parallel, the measuring unit 110 may measure the voltage or the current of the plurality of battery packs connected in parallel. In another example, the measuring unit 110 may obtain the voltage or the current measured in each of the plurality of battery packs.

In operation S120 of calculating the voltage difference between the both terminals of the relay of the plurality of battery packs based on the measured voltage of the plurality of battery packs, the calculating unit 120 may calculate the first voltage that is a voltage difference between the both terminals of the first relay of the plurality of battery packs and the second voltage that is a voltage difference between the both terminals of the second relay of the plurality of battery packs.

In operation S130 of controlling the operation of the relay included in each of the plurality of battery packs and determining whether the relay of each of the plurality of battery packs is stuck based on the operation of the relay included in each of the plurality of battery packs, the voltage difference between the both terminals of the plurality of battery packs, and the measured current of the plurality of battery packs, the controller 130 may control the operation of the relay included in each of the plurality of battery packs. For example, the controller 130 may control operations of the precharge relay, the main relay, and the negative relay included in each of the plurality of battery packs. The controller 130 may determine whether the relay of each of the plurality of battery packs is stuck, based on the operation of the first relay (the main relay), the operation of the second relay (the negative relay), the first voltage, the second voltage, and the measured voltage and current of the plurality of battery packs. For example, the controller 130 may determine whether at least any one of the relays included in the plurality of battery packs is stuck, based on the first voltage and the second voltage. In another example, when determining that at least any one of the relays included in the plurality of battery packs is stuck, the controller 130 may determine which battery pack includes the stuck relay, based on the operations of the first relay and the second relay.

Figure 5:
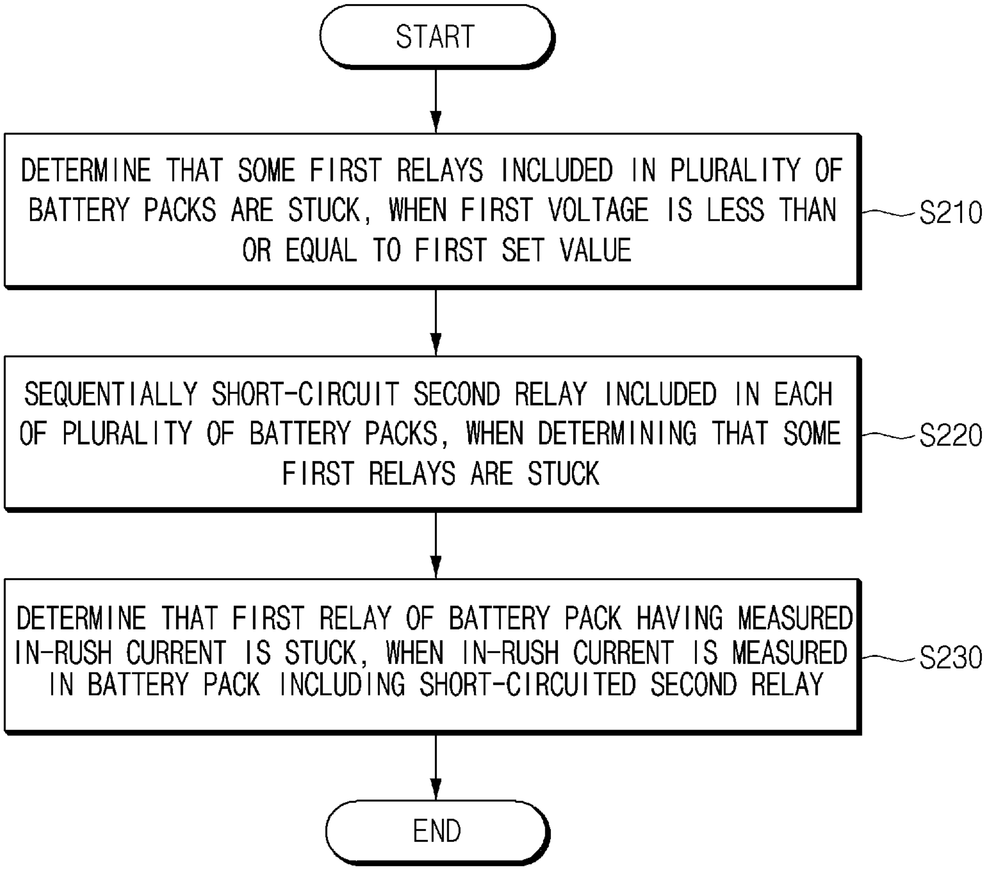
FIGS. 5 to 6 are flowcharts showing in detail an operating method of a battery management apparatus, according to an embodiment disclosed herein.
Figure 6:
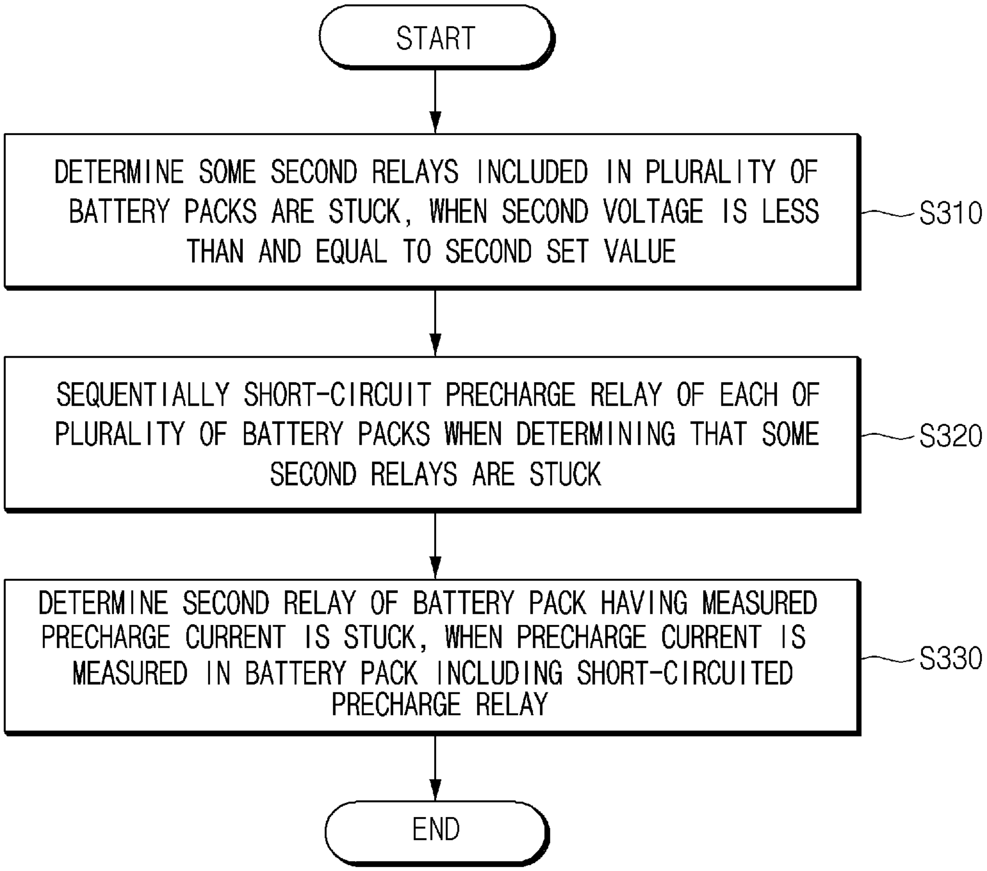

FIGS. 5 to 6 are flowcharts showing in detail an operating method of a battery management apparatus, according to an embodiment disclosed herein.

Referring to FIG. 5, the operating method of the battery management apparatus 100 according to an embodiment disclosed herein may include operation S120 of determining that some first relays included in a plurality of battery packs are stuck when a first voltage is less than or equal to a first set value, operation S220 of sequentially short-circuiting a second relay of each of the plurality of battery packs when determining that some first relays are short-circuited, and operation S230 of determining that a first relay of a battery pack having a measured in-rush current when measuring the in-rush current in the battery pack including the short-circuited second relay. According to an embodiment, operations S210 to S230 may be included in operation S130 of FIG. 4.

In operation S210 of determining that some first relays included in the plurality of battery packs are stuck when the first voltage is less than or equal to the first set value, the controller 130 may determine that some first relays included in the plurality of battery packs are stuck when the first voltage is less than or equal to the first set value. For example, when all first relays included in the plurality of battery packs are opened, the first voltage may be a voltage of the battery pack. In addition, when some first relays included in the plurality of battery packs are stuck, the voltage difference between both terminals of the first relay may be small as being less than or equal to 50 V. That is, the controller 130 may determine that some first relays included in the plurality of battery packs are stuck when the first voltage is less than or equal to a first set value.

In operation S220 of sequentially short-circuiting the second relay included in each of the plurality of battery packs when determining that some first relays are short-circuited, the controller 130 may sequentially short-circuit the second relay (the negative relay) of each of the plurality of battery packs when determining that some first relays (main relays) are stuck. For example, the controller 130 may generate a control signal for controlling the second relay (the negative relay) of each of the plurality of battery packs to be sequentially short-circuited, and transmit the control signal to each battery pack.

In operation S230 of determining that the first relay of the battery pack having the measured in-rush current is stuck when the in-rush current is measured in the battery pack including the short-circuited second relay, the controller 130 may determine the first relay of the battery pack having the measured in-rush current is stuck when the in-rush current is measured in the battery pack including the short-circuited second relay. For example, when the second relay is short-circuited in the battery pack including the stuck first relay, the current flows through the first relay and the second relay, such that the in-rush current may be measured. That is, when the in-rush current is generated in the battery pack including the short-circuited second relay, the controller 130 may determine that the first relay of the battery pack including the short-circuited second relay is stuck. In another example, when the in-rush current is not generated in the battery pack in spite of short-circuiting the second relay, the controller 130 may open the second relay of the battery pack having no in-rush current generated and short-circuit the second relay of the next battery pack. In an embodiment, the controller 130 may determine that the first relay of the battery pack having an in-rush current of 100 mA or more measured is stuck.

Referring to FIG. 6, the operating method of the battery management apparatus 100 according to an embodiment disclosed herein may include operation S310 of determining that some second relays included in a plurality of battery packs are stuck when a second voltage is less than or equal to a second set value, operation S320 of sequentially short-circuiting a precharge relay of each of the plurality of battery packs when determining that some second relays are stuck, and operation S330 of determining that a second relay of a battery pack having a measured precharge current when measuring the precharge current in the battery pack including the short-circuited precharge relay. According to an embodiment, operations S310 to S330 may be included in operation S130 of FIG. 4.

In operation S310 of determining that some second relays included in the plurality of battery packs are stuck when the second voltage is less than or equal to the second set value, the controller 130 may determine that some second relays (negative relays) included in the plurality of battery packs are stuck when the second voltage is less than or equal to the second set value. For example, when all second relays included in the plurality of battery packs are opened, the voltage difference (the second voltage) across both terminals of the second relay may be a half of the voltage of the battery pack by a bias switch of the battery pack. When some second relays included in the plurality of battery packs are stuck, the voltage difference between both terminals of the second relay may be small as being less than or equal to 3V. That is, the controller 130 may determine that some second relays included in the plurality of battery packs are stuck when the second voltage is less than or equal to a second set value.

In operation S320 of sequentially short-circuiting the precharge relay included in each of the plurality of battery packs when determining that some second relays are stuck, the controller 130 may sequentially short-circuit the precharge relay of each of the plurality of battery packs when determining that some second relays are stuck. For example, the controller 130 may generate a control signal for controlling the precharge relay of each of the plurality of battery packs to be sequentially short-circuited, and transmit the control signal to each battery pack.

In operation S330 of determining that the second relay of the battery pack having the measured precharge current is stuck when the precharge current is measured in the battery pack including the short-circuited precharge relay, the controller 130 may determine the second relay of the battery pack having the measured precharge current is stuck when the precharge current is measured in the battery pack including the short-circuited precharge relay. For example, when the precharge relay is short-circuited in the battery pack including the stuck second relay, the current flows through the second relay and the precharge relay, such that the precharge current may be measured. That is, when the precharge current is generated in the battery pack including the short-circuited precharge relay, the controller 130 may determine that the second relay of the battery pack having the short-circuited precharge relay is stuck. In another example, when the precharge current is not generated in the battery pack in spite of short-circuiting the precharge relay, the controller 130 may open the precharge relay of the battery pack having no precharge current generated and short-circuit the precharge relay of the next battery pack. In an embodiment, the controller 130 may determine that the second relay of the battery pack having a precharge current of 100 mA or more measured is stuck.

Figure 7:
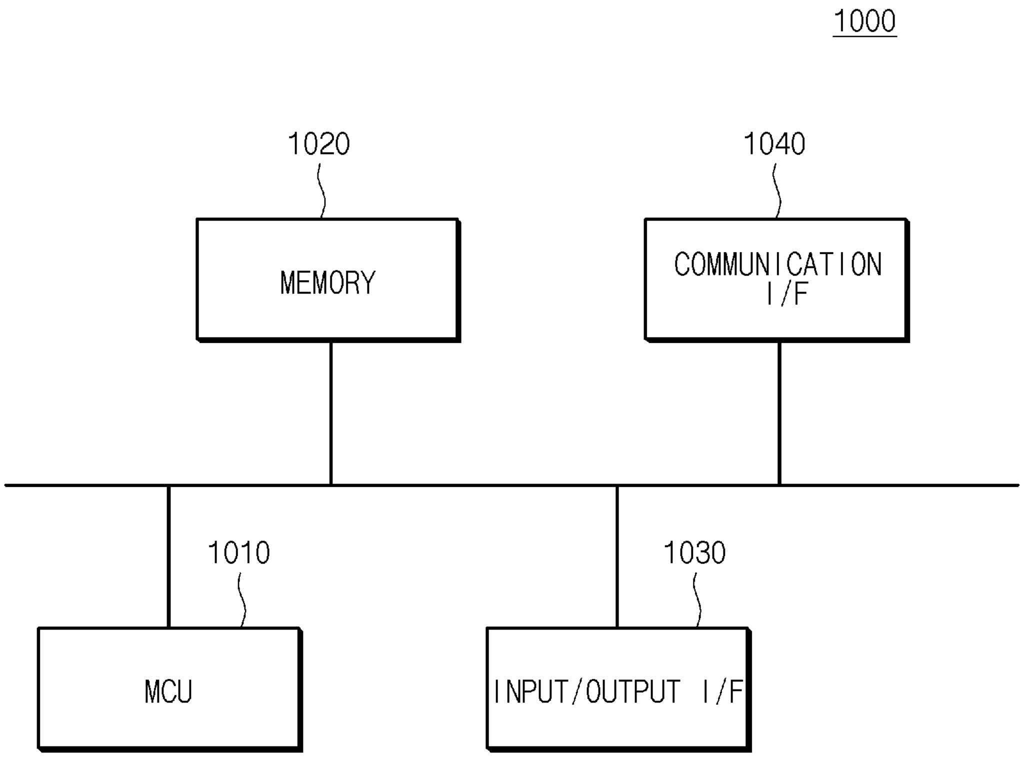
FIG. 7 is a block diagram showing a hardware configuration of a computing system for performing an operating method of a battery management apparatus, according to an embodiment disclosed herein.

FIG. 7 is a block diagram showing a hardware configuration of a computing system for performing an operating method of a battery management apparatus, according to an embodiment disclosed herein.

Referring to FIG. 7, a computing system 1000 according to an embodiment disclosed herein may include a microcontroller unit (MCU) 1010, a memory 1020, an input/output interface (I/F) 1030, and a communication I/F 1040.

The MCU 1010 may be a processor that executes various programs (e.g., a battery maximum/peak power calculation program, a power control program for a battery pack, etc.) stored in the memory 1020, processes various data including a link, a voltage, a charging/discharging power, etc., of a battery pack through these programs, and executes the above-described functions of the battery management apparatus shown in FIG. 3.

The memory 1020 may store various programs regarding log information collection and diagnosis of the battery, etc. Moreover, the memory 1020 may store various information such as a current or a voltage of the battery pack, etc.

The memory 1020 may be provided in plural, depending on a need. The memory 1020 may be volatile memory or non-volatile memory. For the memory 1020 as the volatile memory, random access memory (RAM), dynamic RAM (DRAM), static RAM (SRAM), etc., may be used. For the memory 1020 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 1020 are merely examples and are not limited thereto.

The input/output I/F 1030 may provide an interface for transmitting and receiving data by connecting an input device (not shown) such as a keyboard, a mouse, a touch panel, etc., and an output device such as a display (not shown), etc., to the MCU 1010.

The communication I/F 1040, which is a component capable of transmitting and receiving various data to and from a server, may be various devices capable of supporting wired or wireless communication. For example, the battery management apparatus may transmit and receive a relay control program included in a battery pack or information such as a current or a voltage of various battery packs from an external server separately provided through the communication I/F 1040. The battery management apparatus may transmit information about a battery pack including the stuck relay to an outside through the communication I/F 1040.

As such, a computer program according to an embodiment disclosed herein may be recorded in the memory 1020 and processed by the MCU 1010, thus being implemented as a module that performs functions shown in FIG. 3.

The above description is merely illustrative of the technical idea of the present disclosure, and various modifications and variations will be possible without departing from the essential characteristics of embodiments of the present disclosure by those of ordinary skill in the art to which the embodiments disclosed herein pertains.

Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present disclosure.

The invention claimed is:

1. A battery management apparatus comprising:

a processor; and memory having programmed thereon instructions that, when executed, are configured to cause the processor to:

for each battery pack of the plurality of battery packs connected in parallel:

measure a voltage and a current of the battery pack calculate a voltage difference between both terminals of at least one relay of the battery packs, based on the measured voltage of the battery packs; and control an operation of the at least one relay included in the battery packs; and determine whether any of the one or more relays of any of the plurality of battery packs is stuck, based on respective operations of the one or more relays included in the plurality of battery packs, the respective voltage differences of the one or more relays included in the plurality of battery packs, and the measured currents of the plurality of battery packs.

2. The battery management apparatus of claim 1, wherein, for each battery pack of the plurality of battery packs, the one or more relays comprises a first relay, wherein the voltage difference between both terminals of the first relay is a first voltage.

3. The battery management apparatus of claim 2, wherein the instructions are further configured to cause the processor to determine that at least one first relay of at least one battery pack is stuck based on the first voltage of the at least one relay being less than or equal to a first set value.

4. The battery management apparatus of claim 3, wherein the one or more relays further comprise a second relay, and wherein the instructions are further configured to cause the processor to, in response to at least one first relay being stuck;

sequentially short-circuit each second relay of each of the plurality of battery packs; and determine which first relay of the plurality of battery packs is stuck based on the first relay having a measured in-rush current when its respective second relay is short-circuited.

5. The battery management apparatus of claim 2, wherein the one or more relays further comprises a second relay, wherein the voltage difference between both terminals of the second relay is a second voltage.

6. The battery management apparatus of claim 5, wherein the instructions are further configured to cause the processor to determine that at least one second relay is stuck based on the second voltage of the second relay being less than or equal to a second set value.

7. The battery management apparatus of claim 6, wherein the one or more relays further comprise a precharge relay, and wherein the is instructions are further configured to cause the processor to, in response to at least one second relay being stuck;

sequentially short-circuit each precharge relay of the plurality of battery packs; and determine which that a second relays of the plurality of battery packs is stuck based on the second relay having a measured precharge current is stuck-when its respective precharge relay is short-circuited.

8. The battery management apparatus of claim 1, wherein the one or more relays comprises a first relay and a second relay, wherein the first relay is a main relay and the second relay is a negative relay.

9. The battery management apparatus of claim 1, wherein the battery management apparatus is included in any of the plurality of battery packs.

10. The battery management apparatus of claim 1, wherein the battery management apparatus is included in a higher-level controller of the plurality of battery packs.

11. An operating method of a battery management apparatus, the operating method comprising:

for each battery pack of the plurality of battery packs connected in parallel:

measuring, by a processor, a voltage and a current of each of the plurality of battery packs;

calculating, by the processor, a voltage difference between both terminals of at least one relay of the battery packs, based on the measured voltage of the battery pack; and controlling, by the processor, an operation of the at least one relay included in the battery pack; and determining, by the processor, whether any of the one or more relays of any of the plurality of battery packs is stuck, based on the respective operations of the one or more relays included in the plurality of battery packs, the respective voltage differences of the relay of the one or more relays included in the plurality of battery packs, and the measured currents of the plurality of battery packs.

12. The operating method of claim 11, wherein, for each battery pack of the plurality of battery packs, the at least one relay includes a first relay, and wherein the voltage difference between both terminals of the first relay is a first voltage.

13. The operating method of claim 12, wherein, for each battery pack of the plurality of battery packs, the at least one relay further includes a second relay, and the at least one first relay is determined to be stuck based on the first voltage corresponding to the first relay being less than or equal to a first set value, the method further comprising:

in response to determining that at least one first relays is stuck, sequentially short-circuiting each second relay of the plurality of battery packs; and determining which first relay of the plurality of battery packs is stuck based on the first relay having a measured in-rush current is stuck when its respective second relay is short-circuited.

14. The operating method of claim 11, wherein the one or more relays further comprises a second relay, wherein the voltage difference between both terminals of the second relay is a second voltage.

15. The operating method of claim 14, wherein, for each battery pack of the plurality of battery packs, the at least one relay further includes a precharge relay, and the at least one second relay is determined to be stuck based on the second voltage corresponding to the second relay is being less than or equal to a second set value, the method further comprising:

in response to determining that the at least one second relay is stuck, sequentially short-circuiting each precharge relay of the plurality of battery packs; and determining which second relay of the plurality of a battery packs is stuck based on the second relay having a measured precharge current when respective precharge relay is short-circuited.

* * * * *